F. H. VAN HOUTEN, Jr.
DOUGH ROUNDING-UP MACHINE.
APPLICATION FILED MAR. 20, 1913.
1,153,359.
Patented Sept. 14, 1915.
2 SHEETS—SHEET 2.
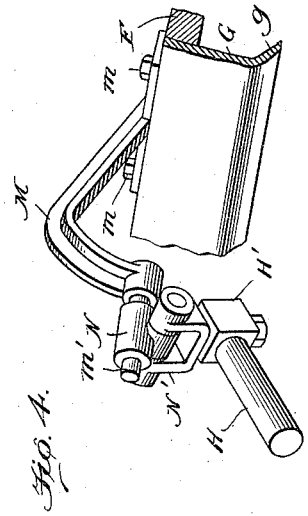
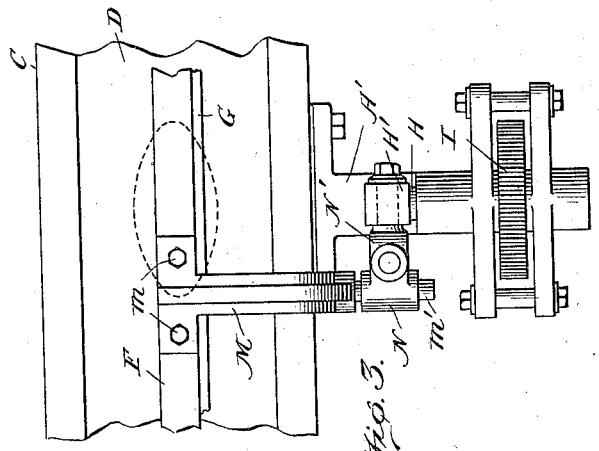
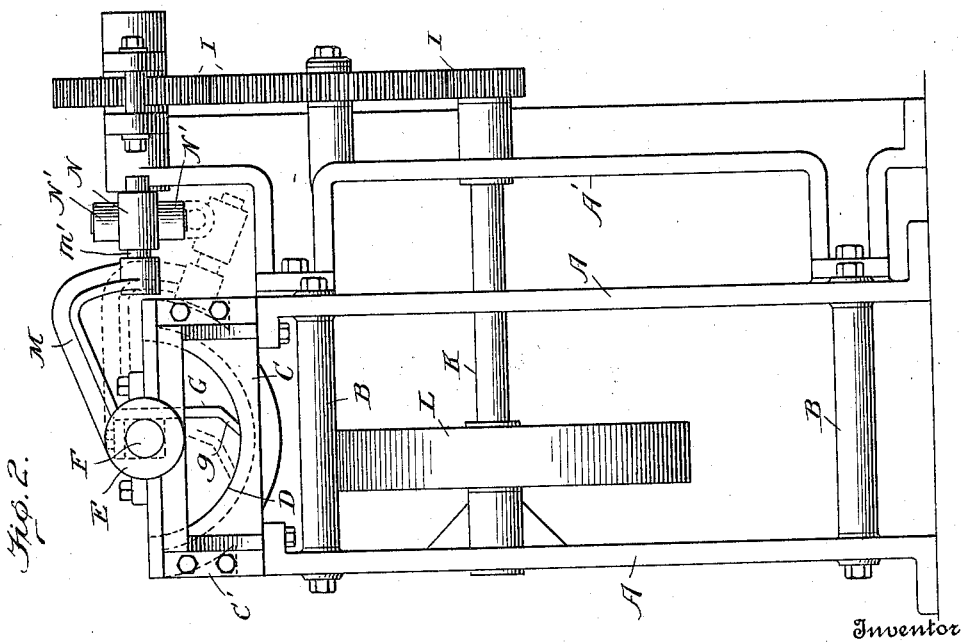
Witnesses
Thomas Durant
Halbert Brown
Inventor
F. H. Van Houten, Jr.
By Church & Church
his Attorneys

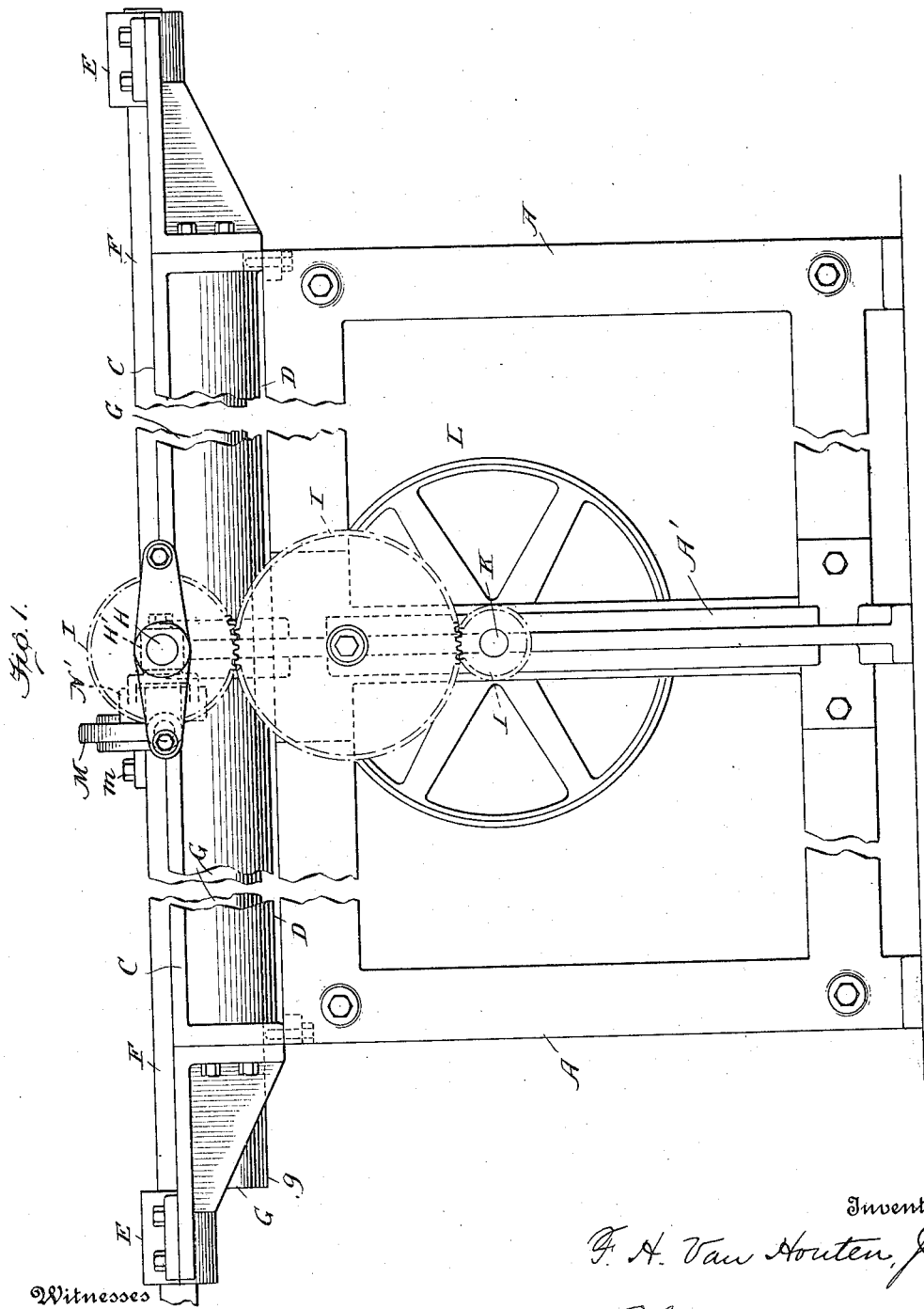

UNITED STATES PATENT OFFICE.

FRANK H. VAN HOUTEN, JR., OF FISHKILL-ON-THE-HUDSON, NEW YORK, ASSIGNOR TO DUTCHESS TOOL COMPANY, OF FISHKILL-ON-THE-HUDSON, NEW YORK, A CORPORATION OF NEW YORK.

DOUGH-ROUNDING-UP MACHINE.

1,153,359.  Specification of Letters Patent.  Patented Sept. 14, 1915.

Application filed March 20, 1913.  Serial No. 755,649.

*To all whom it may concern:*

Be it known that I, FRANK H. VAN HOUTEN, Jr., a citizen of the United States, and resident of Fishkill-on-the-Hudson, in the county of Dutchess and State of New York, have invented certain new and useful Improvements in Dough-Rounding-Up Machines; and I do hereby declare the following to be a full, clear, and exact description of the same, reference being had to the accompanying drawings, forming part of this specification, and to the figures and letters of reference marked thereon.

The object of the present invention is to provide a machine for rounding up, kneading and forming a skin on lumps of dough in the preparation of the same for baking.

Primarily the invention consists in a machine embodying a semicylindrical trough in which the lumps of dough are deposited, said lumps of dough being caused to travel along the trough by an angularly and longitudinally movable blade, the periphery of which travels in proximity to the inner surface of the trough in a circulatory path, whereby the lumps of dough are not only moved longitudinally of the trough but are given an intermittent movement transversely of the trough, whereby they are rolled, rounded-up, kneaded and given a skin finish, such as will impart the desired qualities to the dough for baking into high grade loaves of bread.

More specifically, the machine of the present invention embodies a trough of the character described, a blade carried by a shaft having its axis coincident with the axis of the trough, said blade being movable both angularly and longitudinally with means for imparting the two movements embodying a driven crank shaft with a connection intermediate the crank and blade carrying shaft, whereby the blade is given a range of movement longitudinally of its axis which is in excess of its movement angularly of the axis.

Referring to the accompanying drawings,—Figure 1 is a side elevation of a machine embodying the present invention, intermediate portions being broken away and the drive gearing indicated in outline only. Fig. 2 is an end elevation of the same with the driving gearing in outline. Fig. 3 is a detail top plan view of the crank shaft and connections intermediate the crank shaft and blade shaft. Fig. 4 is a detail view of some of the parts shown in Fig. 3.

Like letters of reference in the several figures indicate the same parts.

The frame of the machine as illustrated in the accompanying drawings is of ordinary conventional type embodying side pieces A connected by top and bottom cross pieces B and forming at the top a seat for the trough bed C. This trough bed is formed integral with or adapted to support a semicircular trough D preferably open at both ends, and while it may be of the same length as the frame A, yet it is conveniently made of greater length by end extensions C', which extensions also carry the bearings E for a shaft F, which shaft is preferably movable both angularly and longitudinally in the bearings and has its axis coincident with the axis or center of the curved surface of the trough. Obviously the shaft might be a fixed shaft and the parts to be presently described movably mounted thereon, but the shaft is preferably itself movable in its bearings. Extending longitudinally of the shaft and secured thereon by any suitable means is a blade G usually arranged tangentially to the periphery of the shaft and having its extremity *g* offset at a slight angle toward the side of the blade on which the lumps of dough are placed, the extreme edge working in close proximity to the inner curved surface of the trough.

Arranged at one side of the frame A and supported preferably on a supplemental frame A' is a crank shaft H adapted to be rotated through a train of gears indicated in outline in Figs. 1 and 2 at I, from a drive shaft K to which power may be applied through a belt pulley L. The crank shaft H on its end in proximity to the trough is provided with a composite crank arm to be presently explained, and extending from the end of this crank arm to the shaft F is a connecting arm M for imparting the movements hereinbefore referred to to said shaft and the blade carried thereby. The connecting arm M is conveniently secured rigidly to the shaft by bolts *m* and is curved or bent intermediate its ends so as to pass down outside of the trough and permit of the crank shaft being located at approximtely the level of the trough. The outer end of the connecting arm M is preferably of cylindrical form as at $m'$ and adapted to work in a cylindrical bearing in the pivoted extremity or end block N of the crank arm. The extremity or end block N is jointed to the intermediate portion of the crank arm, on an axis which is substantially at right angles to the axis of the cylindrical end $m'$ of the connecting arm so as to permit the said arm M to assume an angular position with relation to the axis of the crank shaft, and the intermediate part or member N' of the crank arm is swiveled or pivotally connected with the base H' of the crank arm on an axis which is substantially at right angles to both the axis of the end piece N and of the cylindrical extension $m'$, the result being that a universally jointed crank arm is formed which will cause the blade to move longitudinally of the trough a distance which is equal to the full throw of the crank but owing to the pivotal action of the members as the connecting arm M assumes an angular position with relation to the crank shaft and the cylindrical extension $m'$ partly withdraws from the bearing in the extremity N of the crank arm, the effective throw of the crank is reduced in giving the blade its angular movement and the rotation of the crank shaft imparts to the edge of the blade a circulatory movement in an elongated or elliptical path.

The parts are preferably set for operation in such manner that the blade will lift the dough up at one side of the trough and during the lifting operation it will advance longitudinally of the trough, while on the return stroke or longitudinal movement the dough will be left deposited in the bottom of the trough. To best accomplish this result the blade is preferably set to occupy a substantially vertical position when the crank is horizontal with respect to its shaft and said blade will therefore move substantially equal distances in an angular direction on each side of its vertical position, although it will be understood that the angular position of the blade with relation to the position of the crank for operating the same, may be varied within wide limits and depends somewhat upon the size of the lumps of dough which are to be handled.

It will be obvious that a large number of lumps of dough may be simultaneously treated, it only being necessary to deposit them successively in the trough at one side of the blade at intervals sufficient to space them a distance apart which will prevent them from coming into contact with each other and coalescing. All of the lumps being treated will be advanced and moved simultaneously and each will be accorded the same treatment in all respects.

Having thus described my invention, what I claim as new and desire to secure by Letters Patent of the United States, is:

1. In a dough rounding up machine, the combination of a dough trough forming a receptacle in which dough masses are worked, a dough working member within the receptacle shaped to lift the dough masses from the walls of the trough during the working of the dough and thereby impart a substantially rotary movement to the dough mass on an axis approximately parallel with the longitudinal axis of the trough, and means for moving the dough working member both angularly and longitudinally with respect to the trough, whereby the dough masses are molded and shaped by the contact of surfaces moving simultaneously in different directions.

2. In a dough rounding up machine, the combination of a dough trough forming a receptacle in which dough masses are worked, a blade extending longitudinally of the trough and shaped to lift the dough surfaces from the walls of the trough during the working of the dough and thereby impart a substantially rotary movement to the dough mass on an axis approximately parallel with the longitudinal axis of the trough, and means for moving said blade angularly and longitudinally in a circulatory path for working the dough and advancing the same longitudinally in the trough, whereby the dough masses are molded and shaped by the contact of surfaces moving simultaneously in different directions.

3. In a dough rounding up machine, the combination of a dough trough forming a receptacle in which dough masses are worked, a long blade mounted on an axis coincident with the axis of the trough and shaped to impart a lifting and simultaneously rotary movement to the dough masses during the working of the dough, the edge of said blade being in proximity with the inner face of the trough, and means for imparting simultaneous oscillatory and reciprocatory movements to the blade whereby its edge is caused to travel in a circulatory path, and the dough is simultaneously advanced longitudinally in the trough and imparted a substantially rotary movement about an axis approximately parallel with the longitudinal axis of the trough.

4. In a dough rounding up machine, the combination of a semi-cylindrical trough forming a receptacle in which dough masses are worked, a shaft supported in such manner that its axis is coincident with the axis of the trough, a blade carried by said shaft, movable angularly and longitudinally of the axis, means for imparting simultaneous angular and longitudinal movements to the blade, which acts to advance the dough mass longitudinally in the trough and simultaneously to lift it away from the surface of the trough with a rotary movement about an axis approximately parallel with the longitudinal axis of the trough.

5. In a dough rounding up machine, the combination of a semi-cylindrical trough, forming a receptacle in which dough masses are worked, a blade mounted on an axis coincident with the axis of the trough and movable angularly and longitudinally therein with its edge in proximity to the inner face of the trough to act as a scraper for lifting the dough mass away from the surface of the trough during the working of the dough, a rotary crank shaft and connections intermediate said crank shaft and blade for imparting both angular and longitudinal movements to the blade by which the blade is advanced in the trough in a circulatory path for working the dough longitudinally and simultaneously lifting it vertically with a rotary movement about an axis substantially parallel with the longitudinal axis of the trough.

6. A dough rounding up machine, embodying a semi-cylindrical trough, a blade mounted on an axis coincident with the axis of the trough and movable angularly and longitudinally therein with its edge in proximity to the inner face of the trough, a crank shaft mounted to rotate on an axis at substantially right angles to the axis of the blade, a composite jointed crank on said crank shaft, and a connecting arm intermediate the crank and blade for imparting simultaneous, angular longitudinal movements to the latter.

7. A dough rounding up machine embodying a semi-cylindrical trough, a blade mounted on an axis coincident with the axis of the trough and movable angularly and longitudinally therein with its edge in proximity to the inner face of the trough, a power driven crank mounted to rotate on an axis at substantially right angles to the axis of the blade, a jointed crank on said crank shaft, and a connecting arm rigidly connected with the blade and having a joint connection with the crank.

8. A dough rounding up machine embodying a semi-cylindrical trough, a blade mounted on an axis coincident with the axis of the trough and movable angularly and longitudinally therein with its edge in proximity to the inner face of the trough, a crank shaft mounted to rotate on an axis substantially at right angles to the axis of the blade, a crank carried by said crank shaft and jointed intermediate its length on axes at right angles to each other, and arranged longitudinally and transversely of the length of the crank, and an arm rigidly connected with the blade and having a joint connection with the outer end of the crank.

9. A dough rounding up machine embodying a semi-cylindrical trough, a shaft mounted on an axis coincident to the axis of the trough, a blade mounted tangentially on said shaft and movable both angularly and longitudinally with its edge in proximity to the inner face of the trough, an operating arm rigidly connected with the blade, and a rotary crank to which said arm is jointed for imparting longitudinal and axial movements to the blade.

10. A dough rounding up machine embodying a semi-cylindrical trough, a shaft mounted in bearings on an axis coincident with the axis of the trough and movable angularly and longitudinally, a blade rigidly mounted on the shaft and having its edge portion bent at an angle to the body of the blade and working in proximity to the inner surface of the trough, a bent arm rigidly connected at one end to the shaft and blade and having a cylindrical projection at the opposite end, a rotary crank shaft, a jointed crank mounted on said shaft, and a bearing in the outer end of said crank in which the cylindrical projection of the arm works whereby the rotation of the crank shaft imparts angular and longitudinal movements to the blade to cause its edge to travel in an elongated circulatory path.

FRANK H. VAN HOUTEN, Jr.

Witnesses:
CLAUDE VAN NOSTRAN,
WILLIAM T. STRIPPEL.

Copies of this patent may be obtained for five cents each, by addressing the "Commissioner of Patents, Washington, D. C."